Patented June 29, 1954

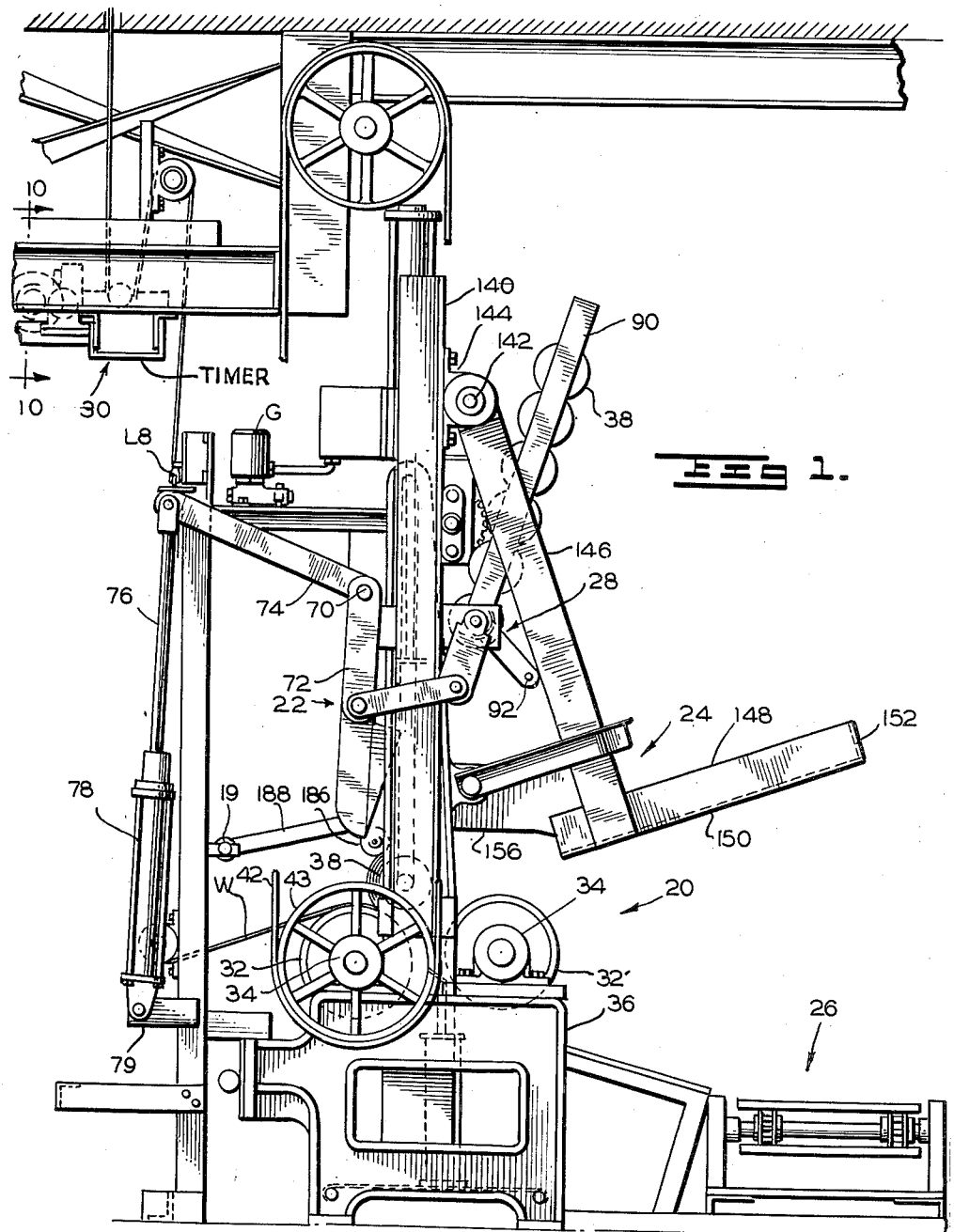

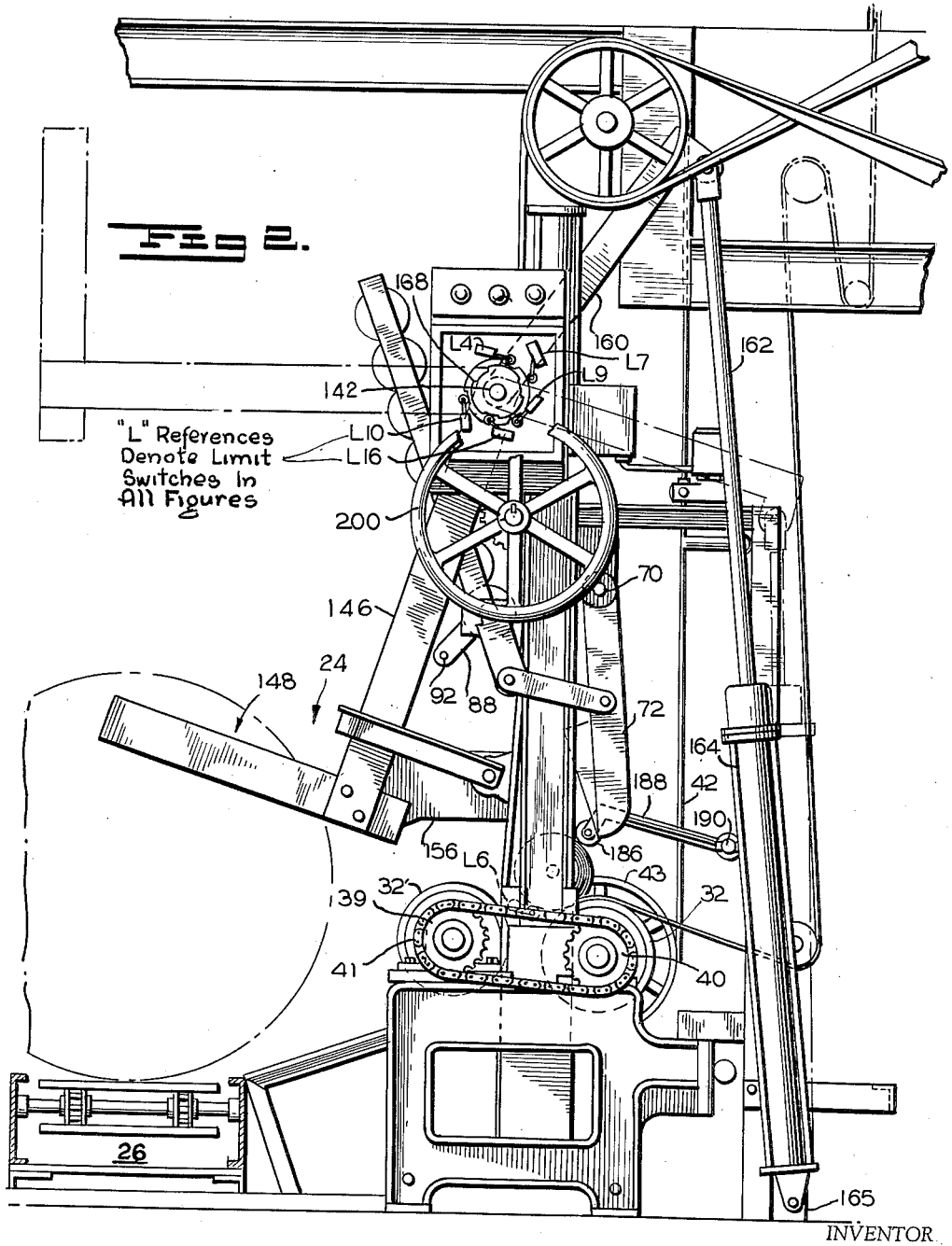

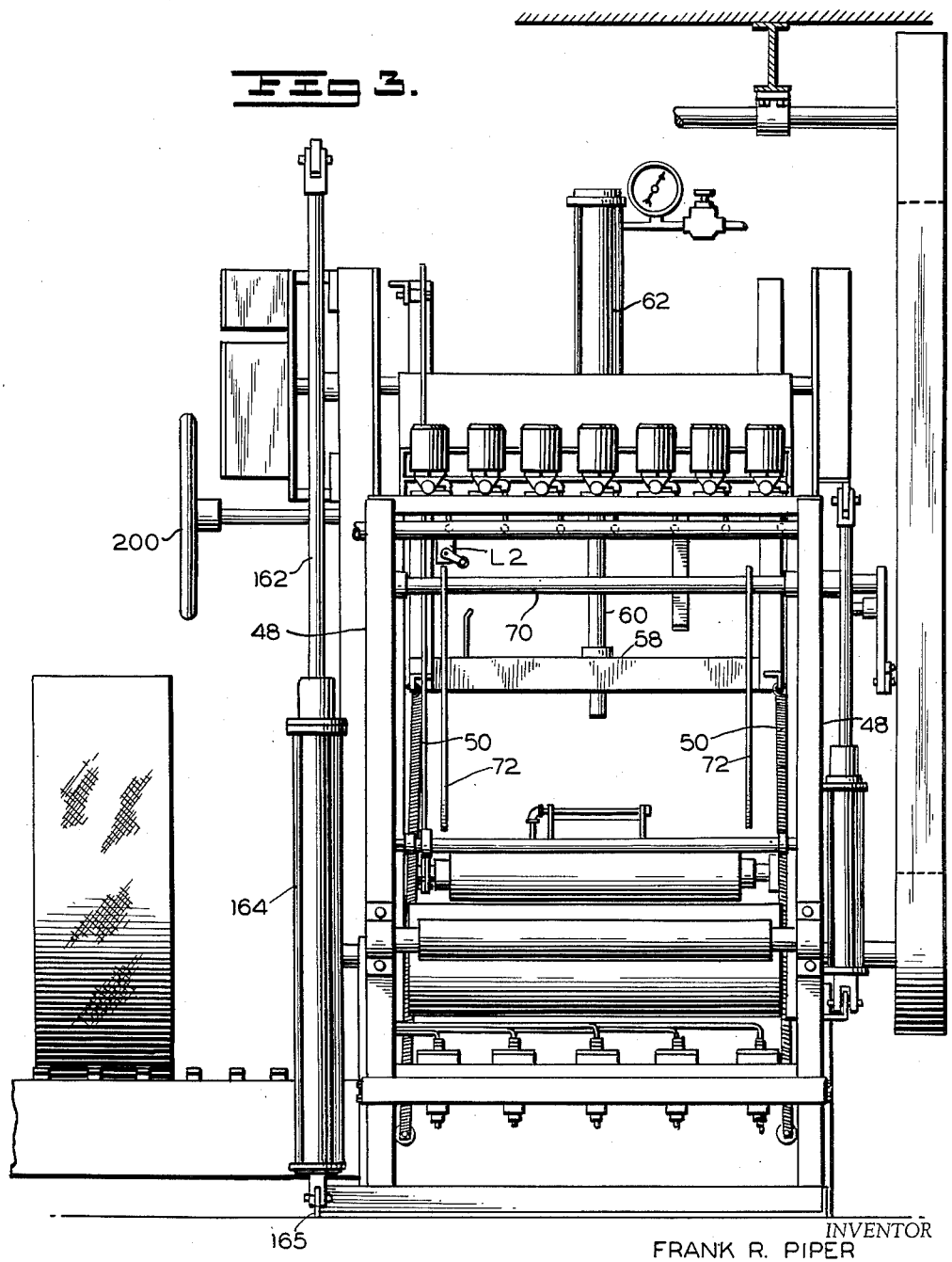

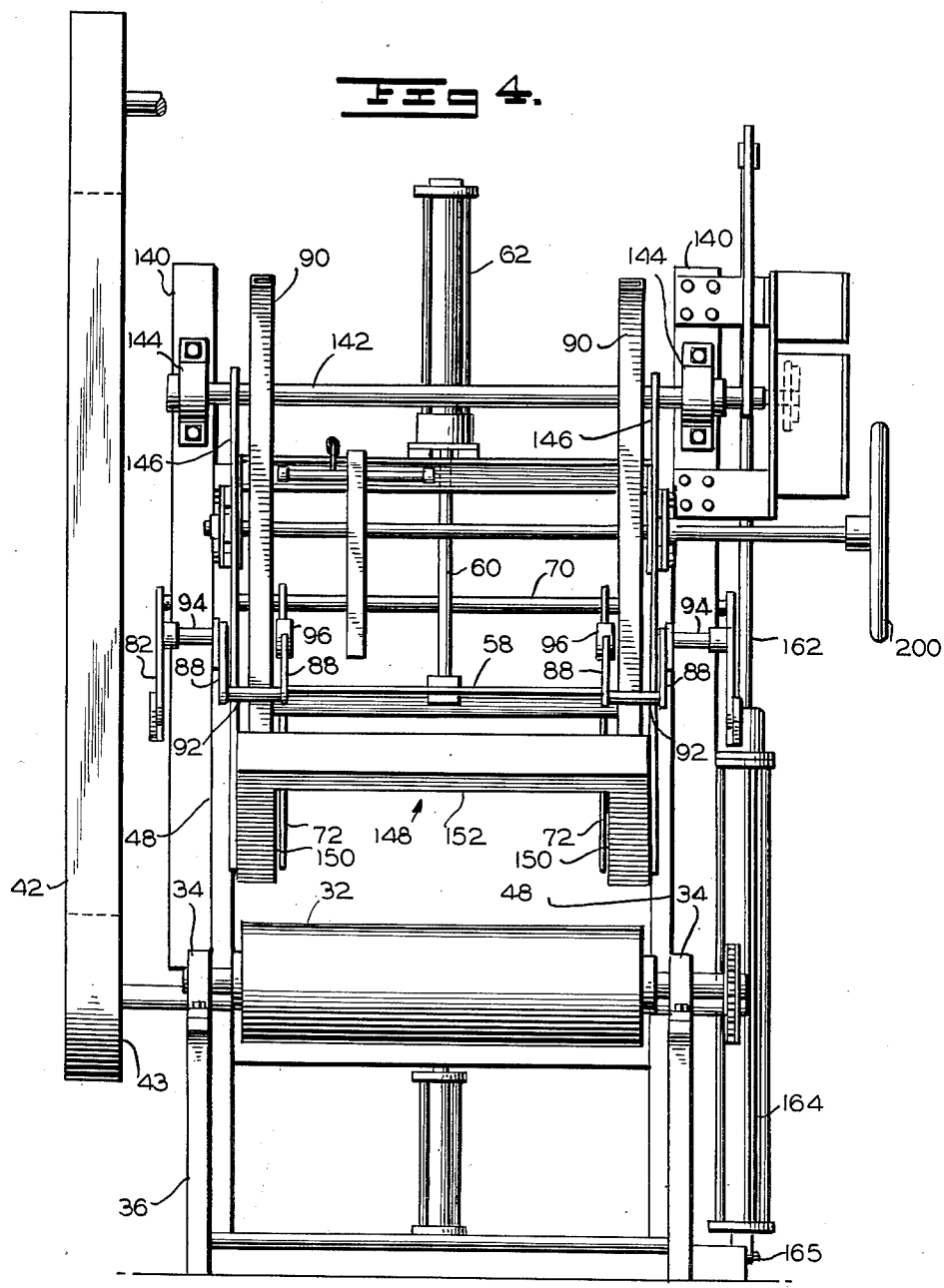

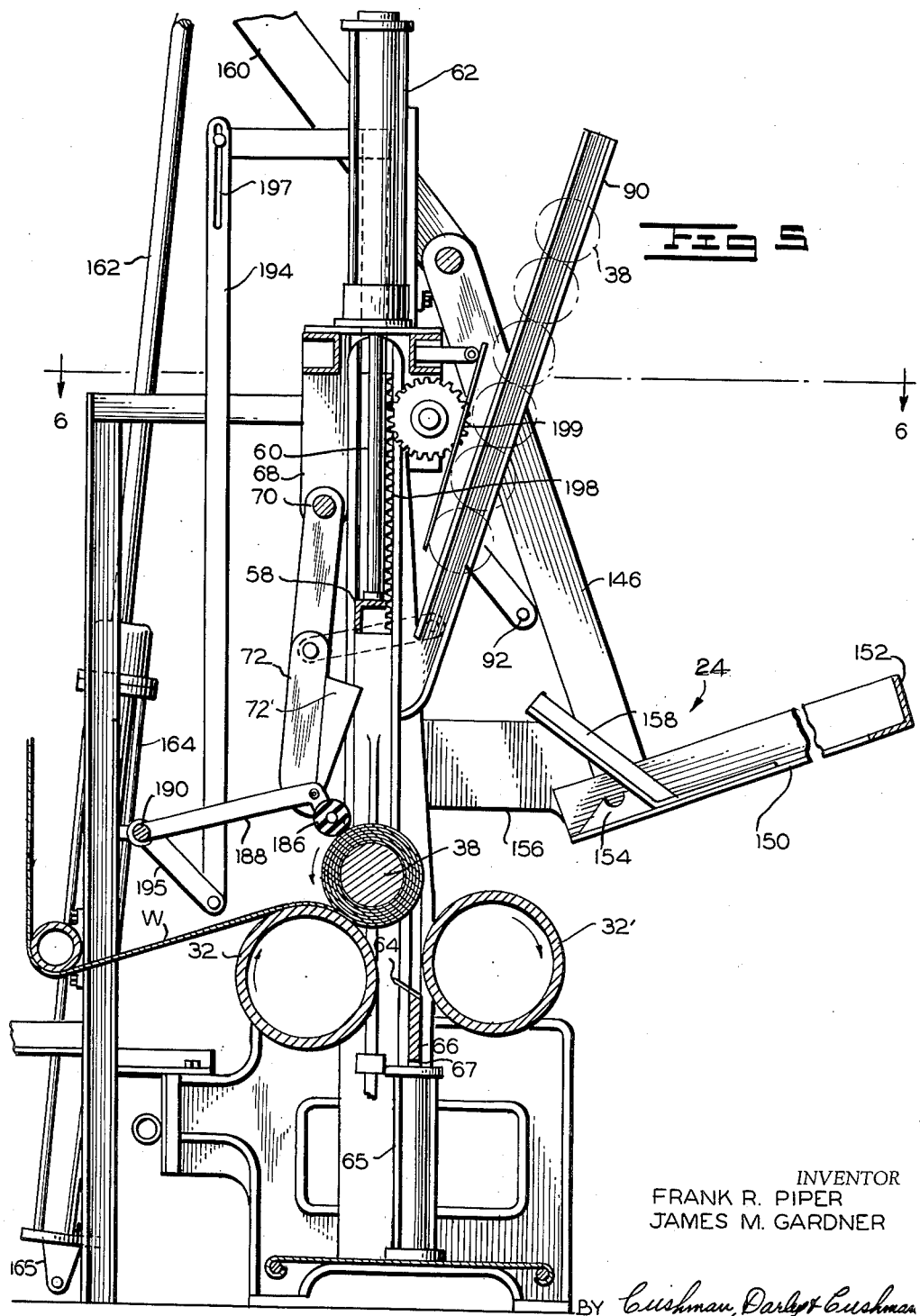

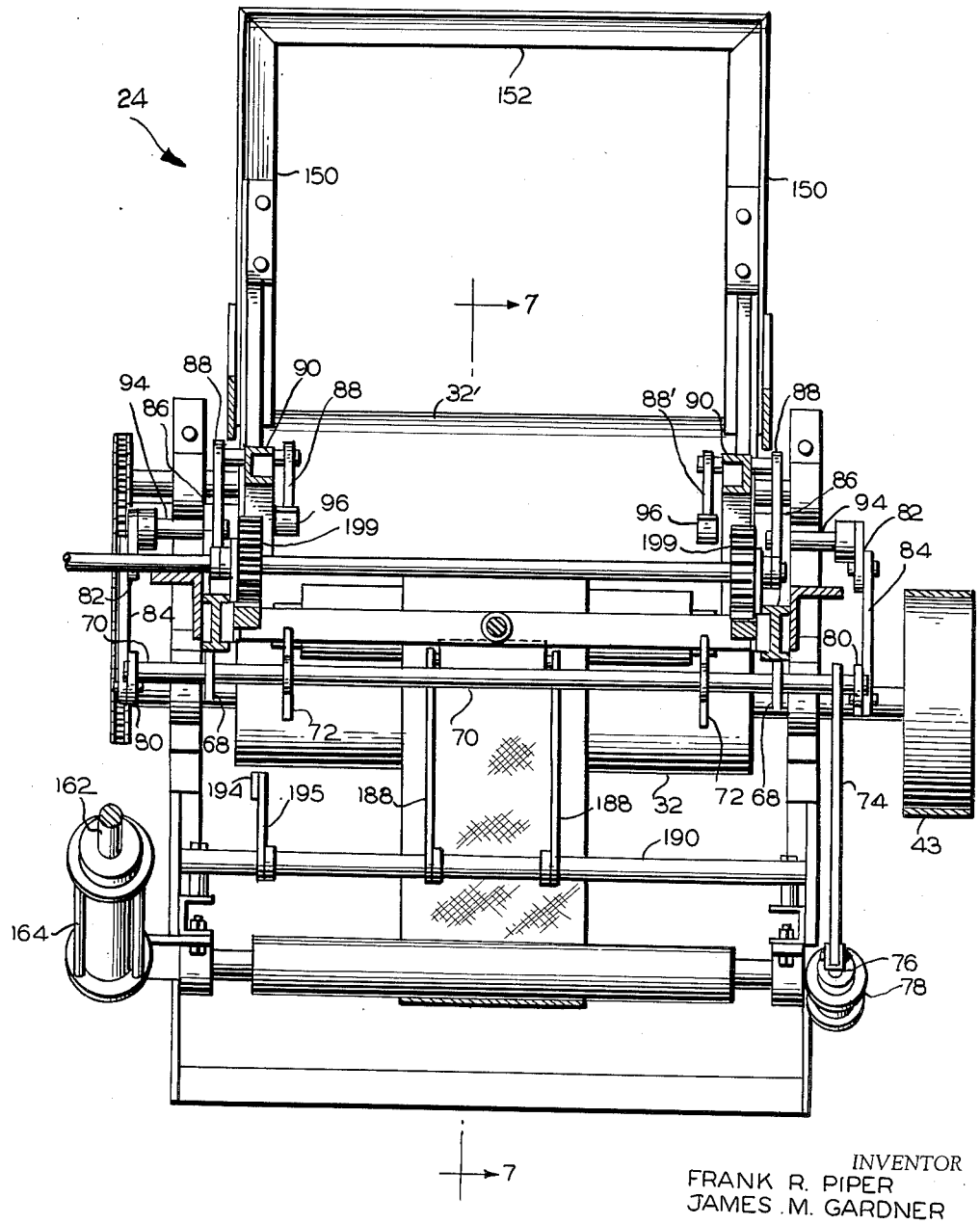

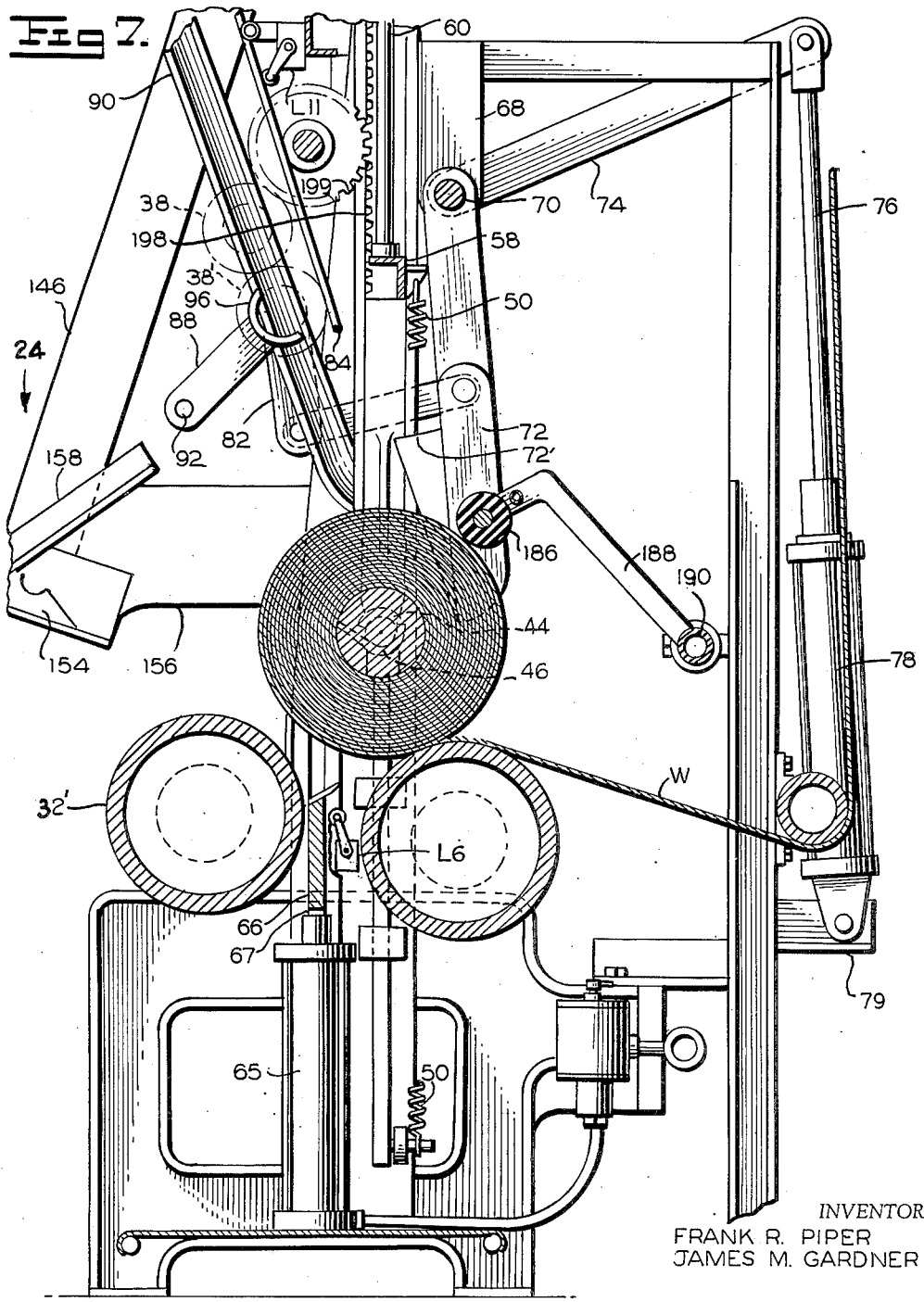

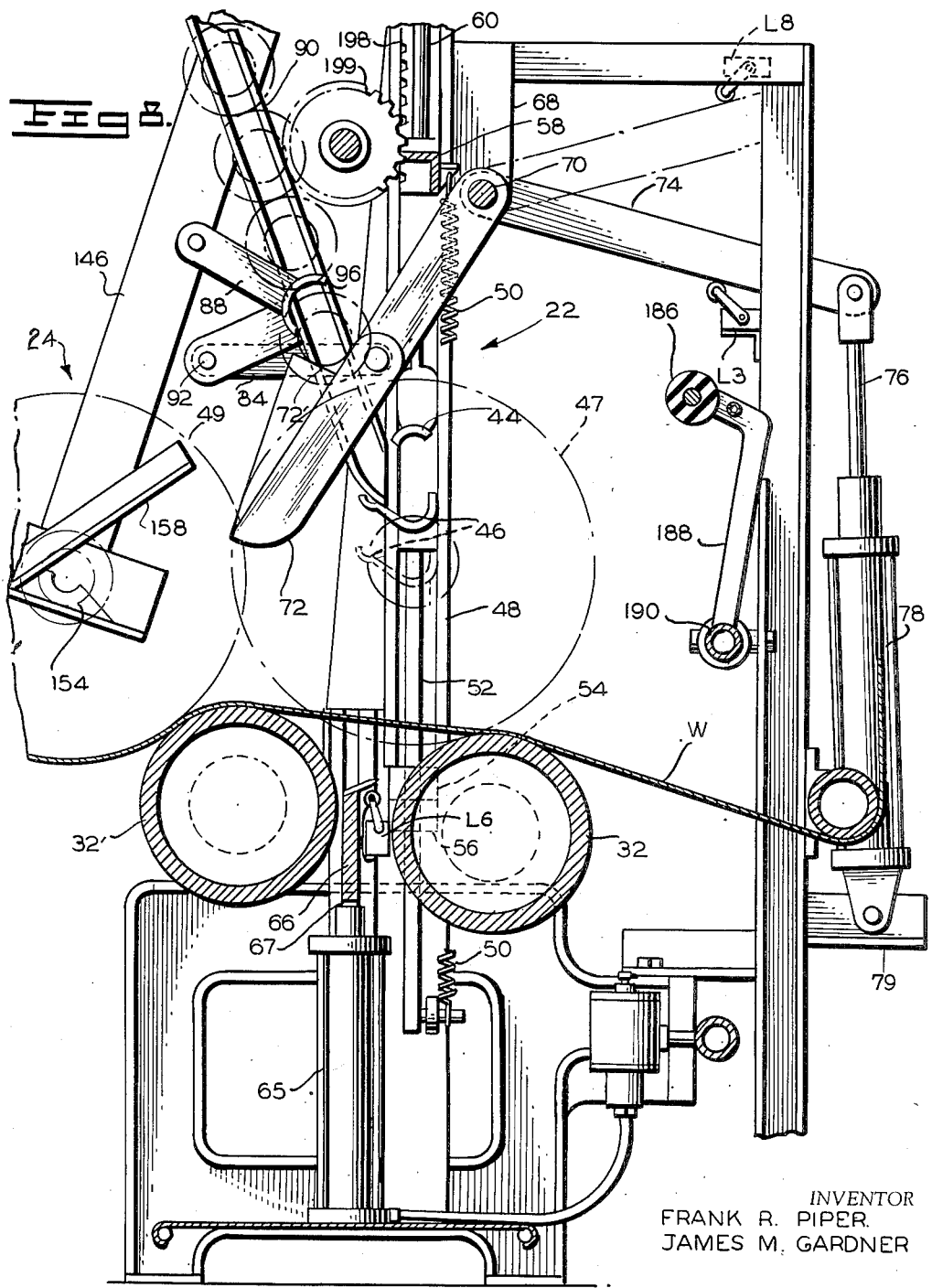

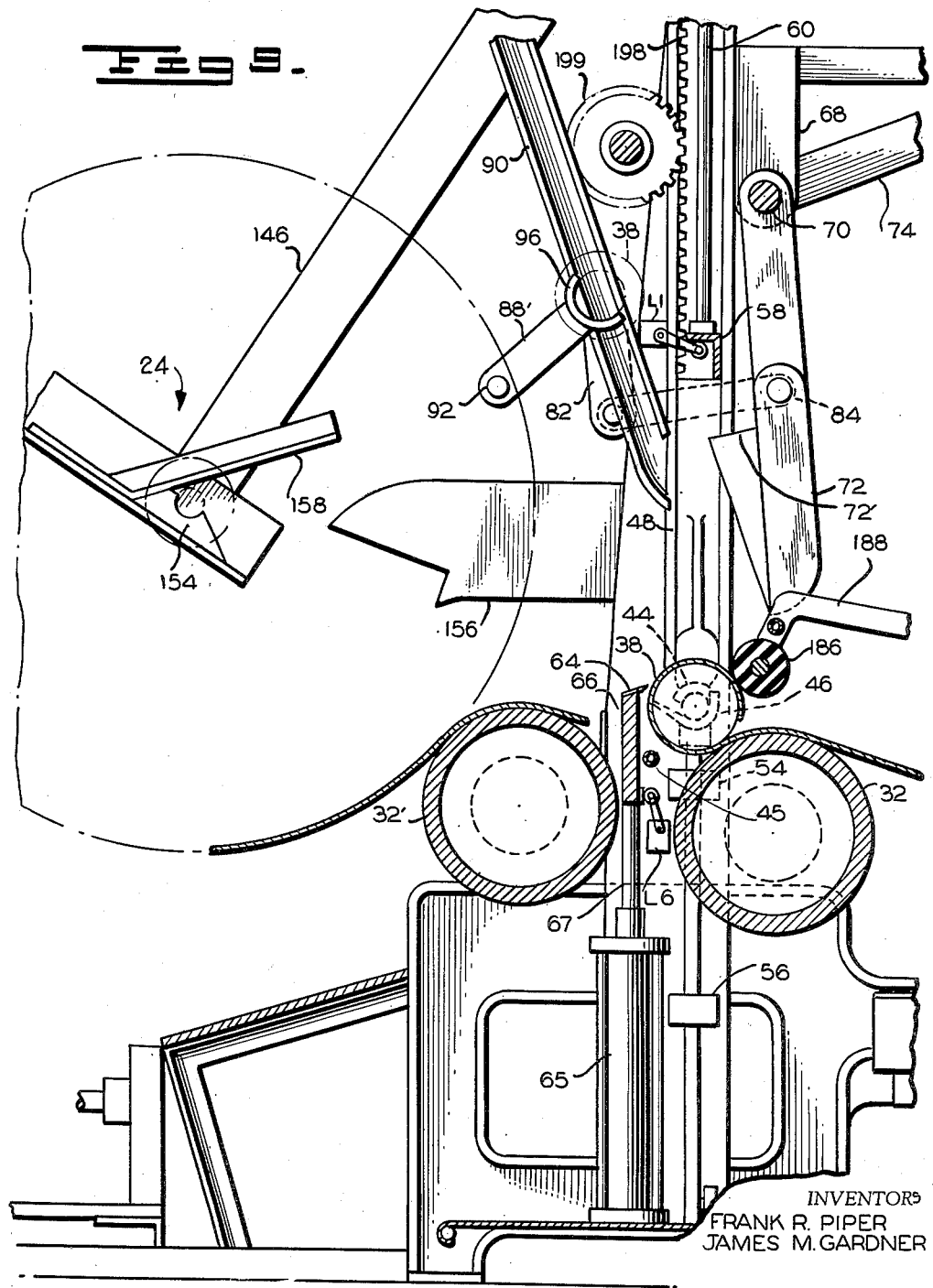

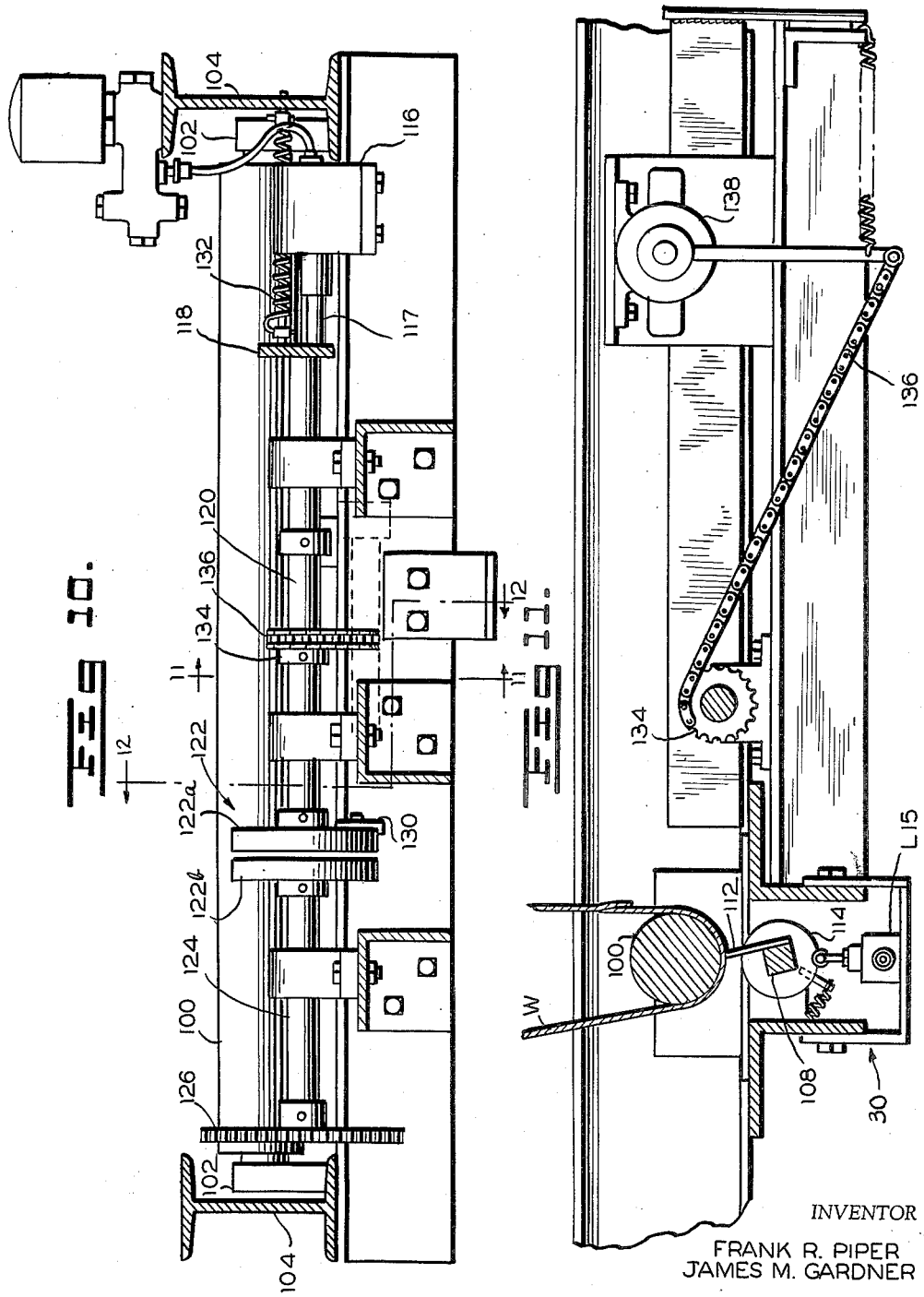

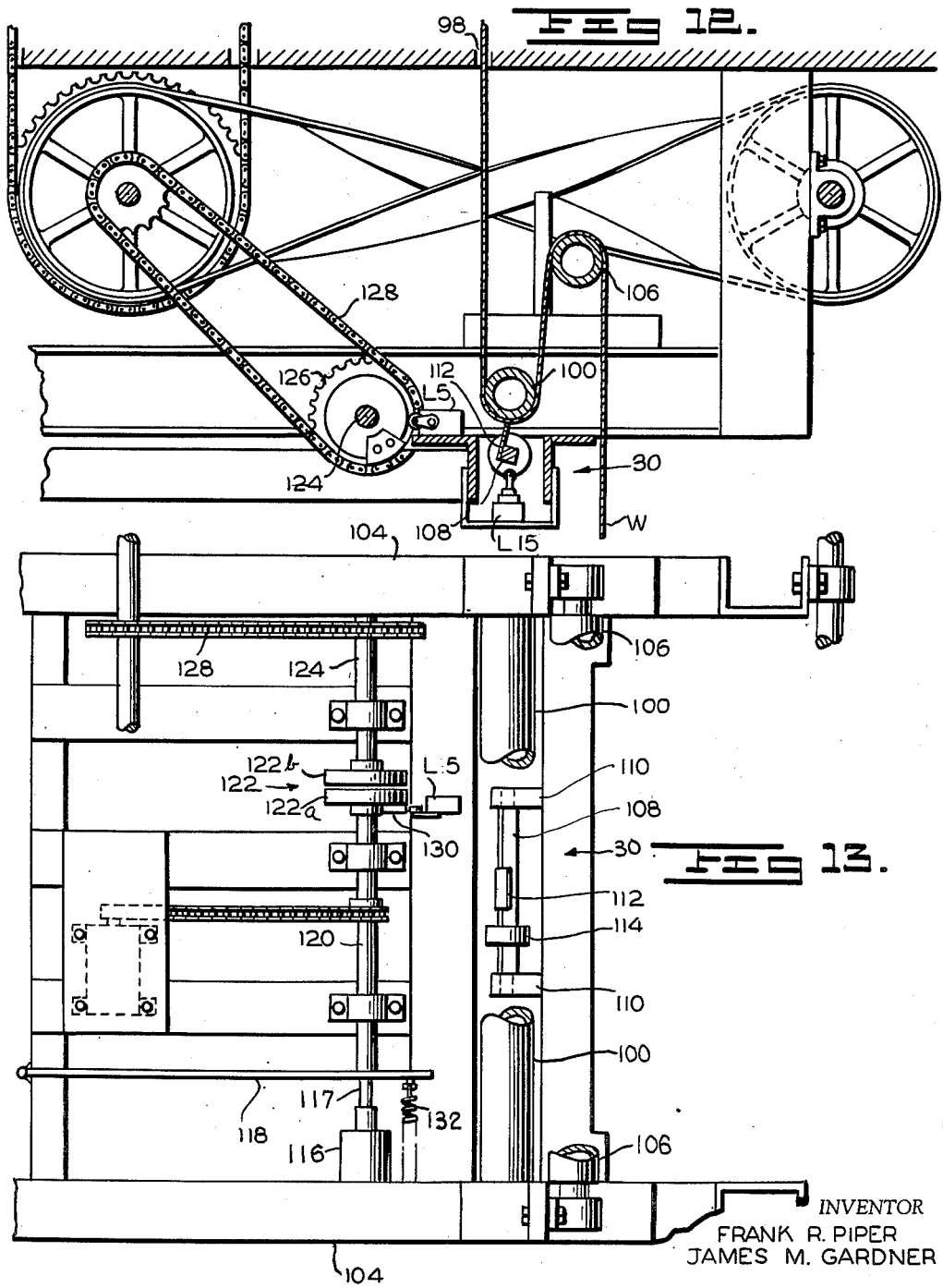

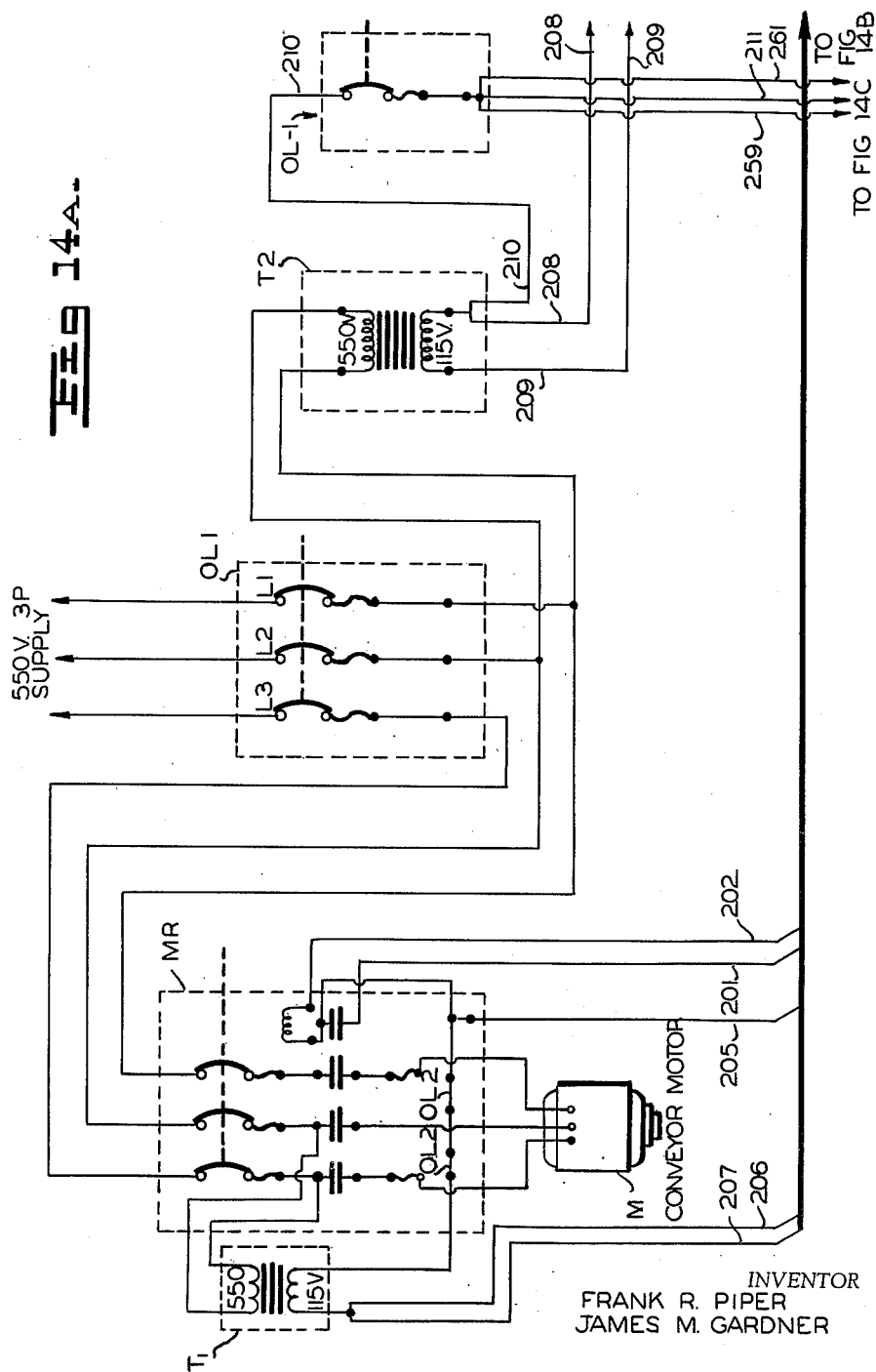

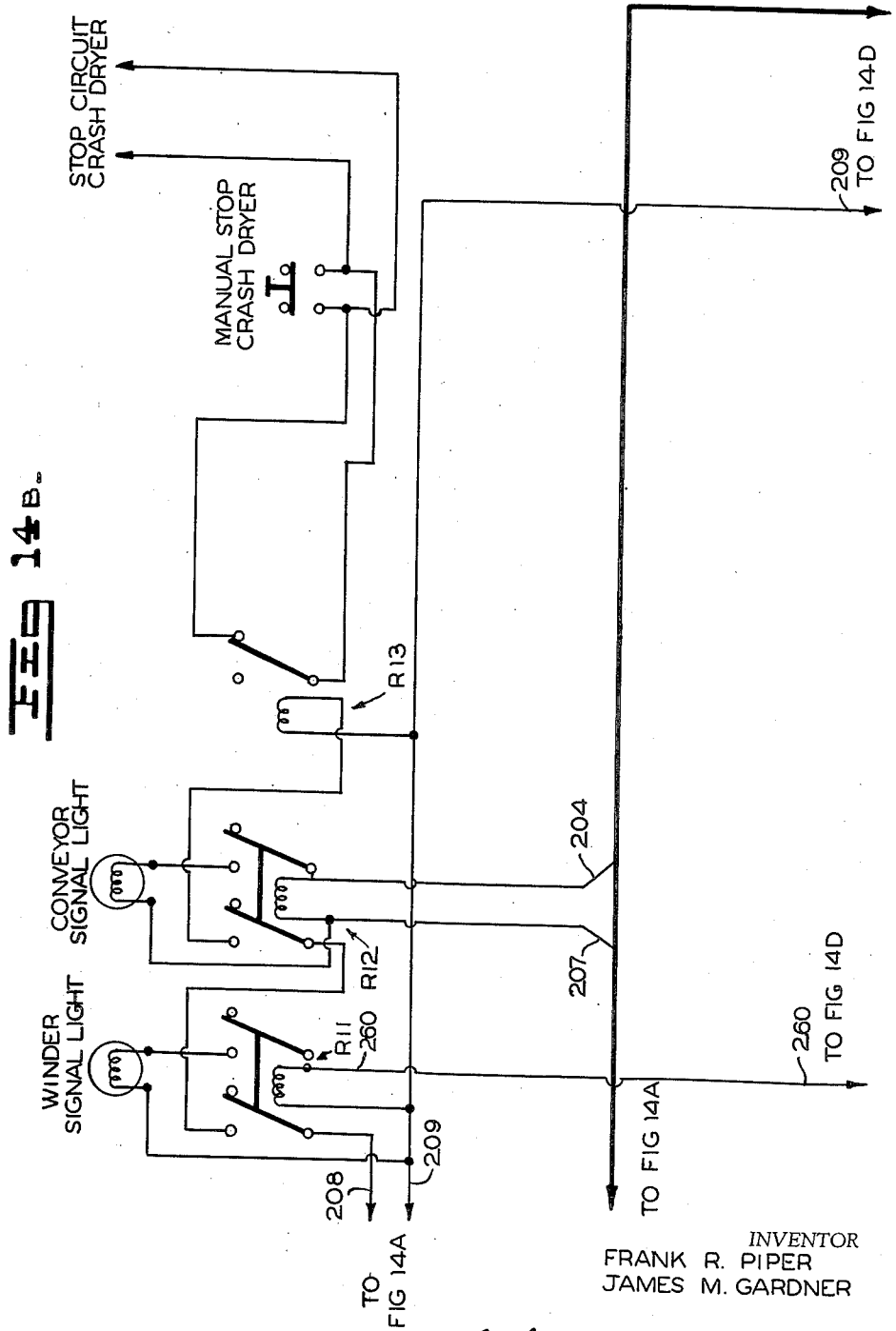

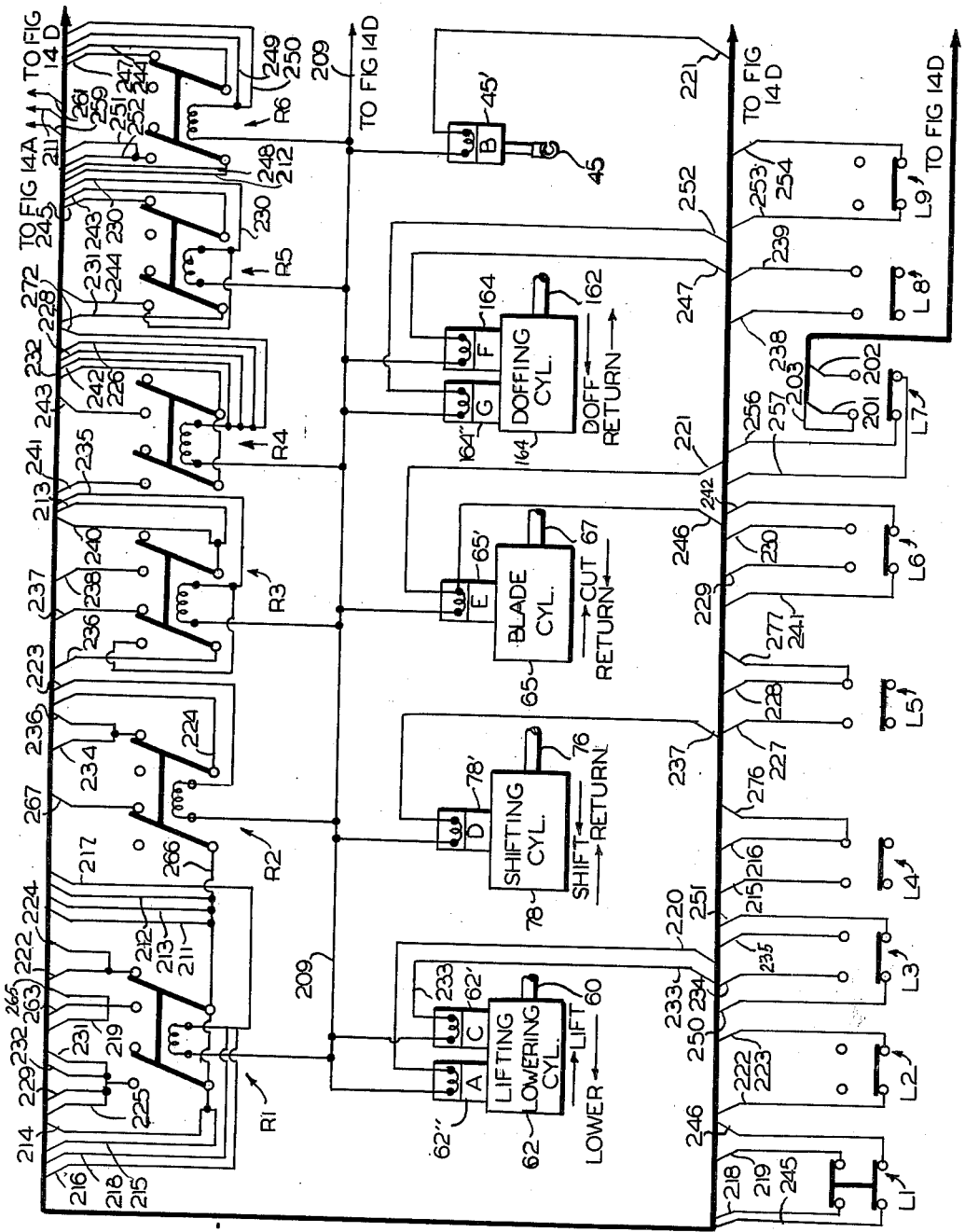

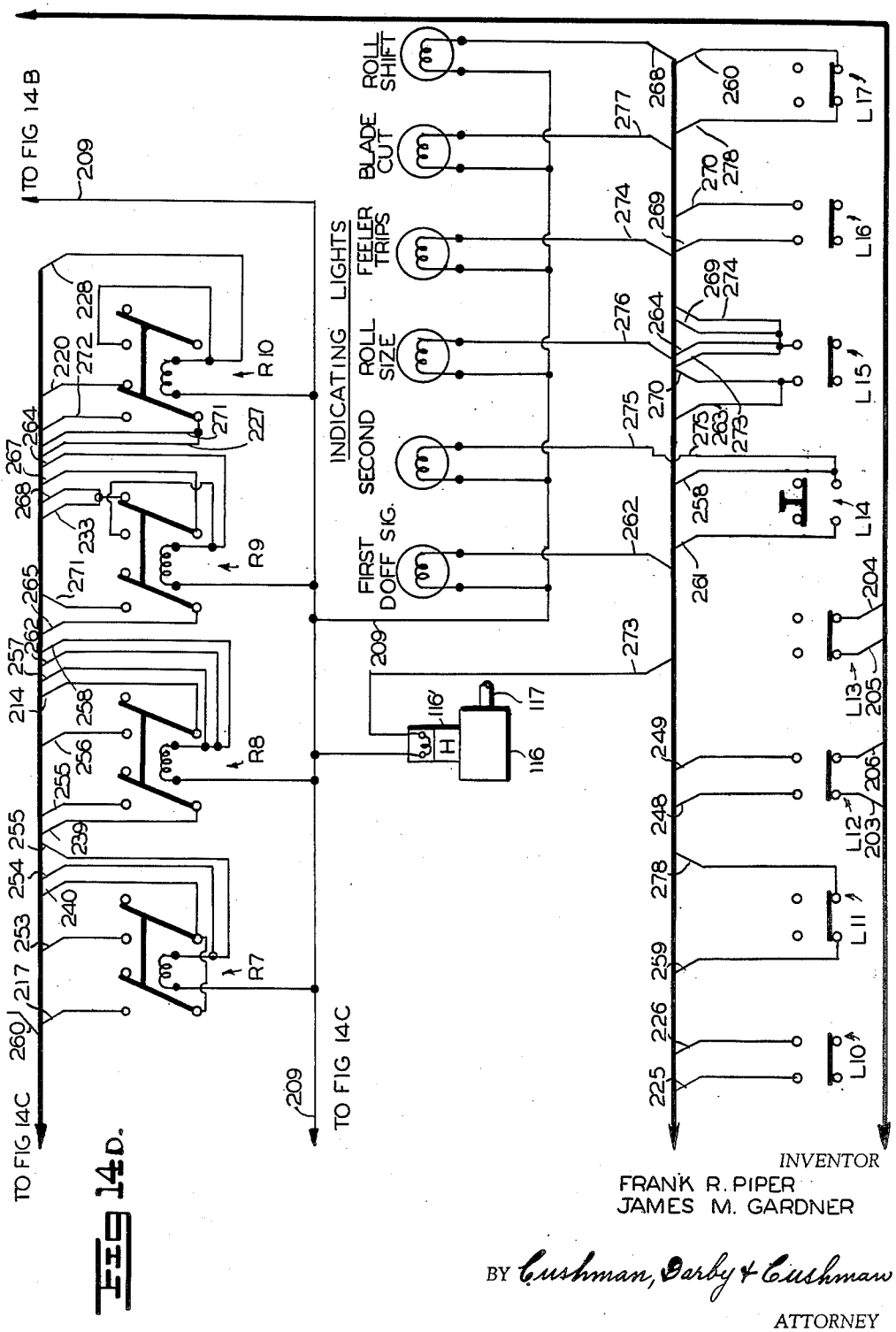

2,682,379

UNITED STATES PATENT OFFICE 2,682,379

AUTOMATIC WINDING MACHINE

Frank R. Piper and James M. Gardner, Fairfax, Ala., assignors to West Point Manufacturing Company, West Point, Ga., a corporation of Alabama Application March 29, 1951, Serial No. 218,141

14 Claims. (Cl. 242—56)

This invention relates to winding methods and apparatus.

The invention relates to automatic handling means which operate in conjunction with winding machines of the type which receive a continuous web of material and wind it upon mandrels. As an example, the material may be cloth toweling which is fed to the winding machine from a series of drying rolls which constitute the finishing process in the manufacture of cloth.

In more detail, the invention is concerned with automatic mechanisms for shifting, cutting, doffing, and lowering of an empty mandrel into the path of travel of the severed web of material to receive the free end. These steps comprise a completely automatic operation whereby the web of material which is continuously being fed from other machines may be received and wound upon mandrels in a fashion so that no stoppage of the machine is required and therefore there is no opportunity for the free end of the cloth to fall to the floor and become soiled or wrinkled.

A further object of the invention is to provide an automatic shifting device whereby a partially filled mandrel may be shifted into engagement with an automatic doffing mechanism and the mandrel may remain in contact therewith until the roll is of such proportions that a cutting mechanism and a doffing mechanism are actuated and the roll is discharged onto a conveyor which displaces the roll to a distant station for further handling.

A further object of the invention is to provide a means by which an empty mandrel may be moved into engagement with the continual web of cloth which is being fed to a filled mandrel in the doffing mechanism.

Still a further object provides a seam detecting mechanism which provides a means by which the continual web may be cut at a seam and the free end of the web wrapped around an empty mandrel.

Further objects and the entire scope of the invention will become apparent from the detailed description set forth below and from the appended claims.

It will be understood that the following detailed description is given only for purposes of illustration and is not intended to limit the scope of the invention.

The invention may be more readily understood with reference to the accompanying drawings, in which:

Figure 1 is a side elevational view of the complete apparatus and its associated automatic mechanisms.

Figure 2 is a rear elevational view with associated mechanisms.

Figure 3 is a side elevational view taken from the opposite side of Figure 1.

Figure 4 is a front elevational view.

Figure 5 is an enlarged vertical sectional view taken substantially along line 5—5 of Figure 4.

Figure 6 is an enlarged horizontal sectional view taken along line 6—6 of Figure 5.

Figure 7 is an enlarged fragmentary sectional view taken substantially along line 7—7 of Figure 6 and illustrates a partially filled mandrel prior to its being transferred to the doffing mechanism.

Figure 8 is a fragmentary sectional view similar to Figure 7 and illustrates the transfer mechanism in its actuated position and partially filled mandrel transferred to the doffing mechanism.

Figure 9 is a sectional view similar to Figures 7 and 8 and illustrates the doffing mechanism in a raised or open position just prior to its actuation and a new mandrel as being lowered and receiving the free end of the continuous web as the cutting mechanism is actuated.

Figure 10 is an enlarged vertical sectional view taken along line 10—10 of Figure 1 and illustrates the seam detecting mechanism and its associated components.

Figure 11 is a vertical sectional view taken along line 11—11 of Figure 10.

Figure 12 is a vertical sectional view taken along line 12—12 of Figure 10 and illustrates the driving means for the seam detecting mechanism and the winding machine.

Figure 13 is a top plan view of Figure 12 with parts broken away.

Figs. 14A, 14B, 14C and 14D show an electrical diagram for the winding machine and its associated mechanisms.

For clarity of illustration, reference is made throughout the following description to cloth winding, but it will be understood that other materials such as paper may be wound equally well.

Referring now to the drawings, and particularly Figure 1 the invention comprises a cloth-winding machine, generally designated at 20, the function of which is to receive a continuous web of cloth W which is delivered from various machines where it is previously treated and finished. The purpose of the winding machine is to provide a means whereby the cloth may be wound upon mandrels which are capable of receiving a large amount of cloth. At the time that a mandrel has received the desired amount of cloth, the cloth is cut and the free end wound around an empty mandrel in a continuous operation and the filled mandrel is discharged onto a conveyor mechanism for further handling.

The shifting mechanism generally designated at 22, comprises a pair of pivotally connected and downwardly extending arms the function of which is to transfer a partially filled mandrel to a doffing mechanism generally designated as 24. The function of doffing mechanism 24 is to discharge a fully wound mandrel to a conveyor mechanism, generally designated at 26. Prior to the doffing of the fully wound mandrel, an empty mandrel is automatically placed into engagement with the continuous web of cloth which is at this time being wound upon the mandrel within the doffing mechanism. The means for introducing an empty mandrel is provided by an inclined rack and release mechanism, generally designated at 28. Simultaneous with the lowering of an empty mandrel into contact with the cloth an automatic timing mechanism generally designated at 30, is actuated and provides a means by which the next seam which appears in the webbing is detected and actuates the timing mechanism to allow the cloth to continue its travel until it has reached a cutting mechanism at which time the cloth is split at the seam and its free end wound around the empty mandrel. The mandrels may be coated with an adhesive material such as Scotch tape or the like, to assure the gripping of the free end of the cloth when it is cut.

Referring now more particularly to the winding machine, generally designated at 20, the basic framework of this device is of the type quite fully described in Simpson Patent No. 542,034. In winder 20 a pair of drums 32 and 32' are suitably journalled in bearing blocks 34 (Figure 1) and are fixedly secured to the framework 36. This arrangement constitutes a structure by which a mandrel 38 may be rotated. The driving means for the drums 32 and 32' is provided by suitable sprockets 39 and 40 and chains 41 (Figure 2) operating at the outer ends of shafts which form an integral part of the drums 32 and 32'. Drums 32 and 32' may be rotatably driven by means of belt 42 and pulley 43, the latter being attached to the shaft of drum 32. As power is applied to belt 42 from any suitable source drums 32 and 32' will be both rotated in a clockwise direction as viewed in Figure 1. Accordingly, and as fully discussed in the above-mentioned Simpson patent, if a mandrel 38 rests upon the surface of drum 32 and the mandrel is rotatably held in suitable guides the cloth W will be caused to wind upon the mandrel 38. As the volume of cloth W increases on mandrel 38 the means holding the shaft of the mandrel will move upwardly in the just-mentioned guides until a predetermined diameter is attained. Referring now particularly to Figure 8 suitable guide supports for the mandrels are provided by a pair of split jaws 44 and 46, adapted to secure both of the ends of the mandrel shafts. An air nozzle 45 (Figure 9) is positioned adjacent the lowermost position of jaw 46, and access of compressed air thereto is controlled by a solenoid valve 45' (Figure 14C), for a purpose presently apparent.

The mandrels will usually have a wood body with metal end caps provided with bearings in which the mandrel shaft may rotate. Accordingly, jaws 44 and 46 need not provide for rotation of the shaft ends. Jaws 44 and 46 are slidably mounted for vertical movement in channels in a pair of upright standards 48 which form the above mentioned guides. A spring 50 secured to the upper portion of the jaw 44 and to the lower portion of the jaw 46 provides a tensioning means by which the jaws are held together while in lowered positions. Downwardly extending squared shafts 52 (Figure 5) provide a guide means for the lower jaws 46, said shafts passing through a pair of blocks 54 which are welded or otherwise secured to the standards 48. A second pair of blocks 56 secured to the squared shafts 52 limit the upward movement of the lowered jaws 46, as seen best in Figure 8. A connecting beam 58 extends transversely of the machine and is welded to the upper jaws 44. A piston rod 60 of air cylinder 62 is secured medially of the upper jaws 54 to the beam 58, as seen best in Figure 4. It will be apparent from the foregoing, that as the jaws are moved to a fully raised position, as shown in Figure 8, to receive a mandrel, the blocks 54 and 56 provide a means by which the jaws are held in an open position against the tension of the spring 50 as the piston of the air cylinder 62 is held upwardly in a retracted position. As the jaws 46 receive the mandrel, the flow of air in the air cylinder 62 is reversed (by means to be described below) thus extending the piston rod downwardly and lowering the jaws 44 into engagement with the jaws 46. Piston rod 60 then continues its downward movement until the mandrel is in engagement with the web of material on rotating drum 32. Referring primarily to Figures 5 and 7–9, the winding machine is provided with a cutting blade 64, said blade extending transversely of the machine and being mounted for vertical movement on a transverse blade guide 66. The raising and lowering of the blade is achieved by means of an air cylinder 65 and piston rod 67.

Assume now that a mandrel is in place and has received the free end of a continuous cloth W, which has been secured thereto. The mandrel will now be considered to be in a first winding position or winding station. As shown primarily in the previously discussed figures, the rotation of the drum 32 in frictional engagement with the mandrel and cloth will cause the counterclockwise rotation of the mandrel 38 and the cloth W, as seen in Figure 5. A still larger view will be observed in Figure 7 which shows the increased diameter of the partially filled mandrel as it continues its vertical travel by means of the jaws 44 and 46. Vertical travel is permitted by relaxation of pressure in air cylinder 62. The roll continues to build up and increase in diameter until it reaches the proportions shown in the chain line 47 in Figure 8 at which time the transfer mechanism generally indicated at 22 is actuated. The purpose of this mechanism is to provide a means by which the roll of cloth may be transferred to the chain line position 49, as shown in Figure 8. The above mentioned transfer mechanism generally indicated at 22, will be hereinafter more fully described. Depending on the relative location of the two drums, the roll while at the first winding station may remain on drum 32, or may transfer its weight to drum 32'.

Referring primarily to Figures 6 and 8, a pair of bearing brackets 68 welded to the standards 48 provide a bearing means for a transverse shaft 70, which is rotatably journalled therein. A pair of downwardly extending transfer arms 72 are spaced inwardly of the bearing brackets 68 and are fastened for rotation with the transverse shaft 70 and constitute a means by which the partially filled mandrel may be transferred from the chain line 47 to the chain line position 49, as viewed in Figure 8, through the engagement of the lower portion of the transfer arms 72 with the shaft of the mandrel. Actuating means for the transfer mechanism are provided by an upwardly and rearwardly extending link 74, suitably fastened at one end to the transverse shaft 70 and secured at its other end to a piston rod 76 of an air cylinder 78 which is pivotally secured to a standard 79. As will be described in more detail below, the actuation of the air cylinder is provided by a limit switch L2, the contact arm of which lies within the vertical plane of travel of the beam 58 (Figure 3) and at the time that the diametrical proportions shown in dotted line in Figure 8 are achieved, the limit switch L2 is closed to introduce air to the cylinder 78 causing the piston rod to retract and rotate the transverse shaft 70, causing the arcuate movement of the transfer arms 72 from the position shown in Figure 5 to the position shown in Figure 8. The force of the arms 72 on the mandrel shaft will cause the jaws 44 and 46, which are resiliently urged together, to yield and permit the shaft to escape. The mandrel and the roll thereon are then received by the doffing mechanism to be described below. As will be more fully explained below, actuation of switch L2 also causes upward actuation of piston rod 60 of air cylinder 62, thus causing lower jaws 46 to move to their uppermost position as viewed in Figure 8. Still a further function of the transfer mechanism is to release and lower a new mandrel from the rack assembly, generally designated at 28, into engagement with the lower jaws 46 of the winder mechanism. The details of the abovementioned rack and its release assembly are now more fully set forth. Referring primarily to Figure 6, at both ends of and journalled to the outer ends of the transverse shaft 70, a downwardly extending link 80 is pivotally connected to a rocker assembly 82 by means of a link 84 pivotally connected at the lower ends of the link 80 and rocker assembly 82. The rocker assembly 82 is rotatably mounted in bearing brackets 86 welded or otherwise secured to the standards 48 and comprises a pair of forwardly and downwardly extending links 88 and 88' disposed on either side of inclined channel members 90. The links 88 and 88' are secured at their lower portion by means of bolts 92. The upper portion of links 88 are rotatably journalled to stub shafts 94 rotatably mounted in the bearing brackets 86. The upper portions of the links 88' are provided with a crescent-shaped or semi-open strap 96 adapted to receive reduced shoulder portions of the mandrels 38 which are maintained in a stacked relation, as shown in Figure 1, within the channel members 90.

Referring now to Figures 7 and 8, as the air cylinder 78 is actuated by limit switch L2 and moves the transfer arms 72 to the position shown in Figure 8, it will be seen that the discharge or the release mechanism for the stacked mandrels is simultaneously actuated through the linkage 80, 82 and 84, and rotates the links 88 and 88' about the stub shaft 94. Thus the lowermost mandrel 38' (Figure 7) is released and travels downwardly in the channel members 90 into engagement with an offset portion 72' of the transfer arms 72. However, the leading end of strap 96 blocks the next higher mandrel from dropping along the channel members 90. The mandrel is held in this position until the transfer arms again return to the position as shown in Figure 7, at which time, the mandrel continues its downward travel into engagement with the lower jaws 46.

The jaws 44 and 46 remain in the raised position until the now transferred mandrel is ready to be doffed.

Let it now be assumed that the transferred and partially filled mandrel, which is at this time retained within the doffing mechanism, has reached adequate diametrical proportions and is to be discharged onto the conveyor mechanism. A limit switch L15 has a circuit now enabled by reason of a limit switch L6 responsive to a roll of predetermined size at the doffing or second winding position. Switch L15 is momentarily closed by the next seam or sluffed filling which in turn simultaneously actuates the timing mechanism 30. The seam then continues its downward travel into the vertical plane of travel of the cutting mechanism. At the same time the empty mandrel 38' is released and lowered onto the moving material and a light downward pressure is maintained to preclude slippage. At the time the seam arrives at the blade 64 the timing mechanism 30 will have operated and the moving web of cloth is cut and the free end raised around the empty mandrel by a blast of air from a nozzle located beneath the cloth and indicated at 45. As the cutting blade is retracted, the doffing mechanism is actuated and releases the filled mandrel onto the conveyor. The actuation of the doffing mechanism starts the conveyor motor and carries the roll of material away from the winder a distance sufficient to bring a new surface of empty conveyor into position to receive the next roll of material doffed from the winder.

The above-mentioned timing mechanism generally indicated at 30, whose function is to initiate action of the previously described mechanisms, will now be hereinafter more fully described. Referring now more specifically to Figures 10, 11, 12, and 13, the continuous web of cloth W is fed downwardly through an opening in the ceiling, indicated at 98, and around a roll 100 suitably journalled in bearing blocks 102, which latter are in turn secured to suspended I beams 104. The cloth then is fed upwardly and over an idler roll 106 and from there downwardly to the winder. Positioned beneath the roll 100 is a squared shaft 108, rotatably mounted in bearing blocks 110, which provides means by which an upstanding feeler finger 112 is held in close engagement with the web of cloth as it passes beneath the roll 100. Spaced from the finger 112 and journalled to the squared shaft 108 is a notched cam disk 114 which provides an actuating means for the limit switch L15. From the foregoing, it will be apparent that as the continuous web of cloth passes around the roll 100, the detector finger 112 remains in a substantially fixed position until a seam or sluffed filling will cause the detector finger to rotate the squared shaft in clockwise position, as seen in Figure 12, and at the same time rotating the cam disk 114, which in turn causes the actuation of the limit switch L15. By circuits to be described below the actuation causes the simultaneous lowering of the empty mandrel into the path of the moving cloth and also energizes a solenoid valve H, thus directing a flow of air to an air cylinder 116 and causing the piston rod 117 of the air cylinder to contact a pivoted bar 118, shown in Figures 10 and 13. The movement of the said bar 118 against a shaft 120 slides the shaft and initiates the engagement of a clutch 122. One disk 122a of the clutch is journalled to the shaft 120, and the second disk 122b is journalled to a shaft 124 driven through suitable sprocket 126 and chain 128. The shaft 120 is rotated in a clockwise direction, as seen in Figure 12. The clutch plate 122a journalled to the shaft 120 is provided with a radially disposed plate or contact member 130, and upon rotation, engages a limit switch L5. Suitable means to be described below are provided for relieving the pressure in cylinder 116 as the revolution is completed and piston rod 117 will thus be retracted and clutch 122 disengaged by means of a tension spring 132 secured at one end to the bar 118 and at its opposite end to one of the I-beams 104. Means for resetting the shaft 120 in a counterclockwise direction, as seen in Figure 12, are provided by a sprocket 134 journalled to the shaft 120 and having secured thereto a rearwardly extending chain 136 connected at its opposite end to a motion dampening means 138. This provides a means by which the clutch may be reset for the following operation.

It will be understood from the foregoing that as the seam or sluffed filling on the web of cloth is fed downwardly and under the roll 100, the detector finger 112 will cause the rotation of the squared shaft 108, thus actuating the limit switch L15. This causes the piston rod of the air cylinder 116 to cause the clutch 122 to engage. This engagement causes the rotation of the clutch and contact member 130 to engage limit switch L5, and this actuates the cutting mechanism. It will also be understood that the rotation of the clutch 122 through the chain 128 and sprocket 126 constitutes a measuring device whereby the detected seam is allowed to pass from the detector finger 112 into the machine and to a position directly over the serrated cutting blade 64 and thus be cut at this point. That is, the timing device will be driven in synchronism with the winding drums and therefore a definite relation will exist between the time of operation of the switch L5 and the distance travelled by the seam.

The forward projection of the serrated cutting blade actuates a limit switch L6 which reverses the flow of air from a solenoid valve and allows the blade to return to its normal position. Simultaneous with this operation, the limit switch L6 actuates the doffing mechanism which will now be more fully described.

Referring primarily to Figure 1, a pair of upright standards 149, welded or otherwise secured to the standards 48 of the winder, constitute a supporting structure for rotatably securing a transverse shaft 142 which is suitably journalled in bearing blocks 144. A pair of downwardly and forwardly extending arms 146 are spaced inwardly of the bearing blocks 144, as seen in Figure 4. The arms 146 constitute a rotatable hanger assembly for the doffing mechanism 24 and are welded or otherwise secured at their lower ends to an angularly disposed U-shaped frame 148 which comprises a pair of forwardly and rearwardly extending angle irons 150 connected at their extreme ends by a transverse angle iron 152. A pair of semi-open bearing blocks 154 are welded at the forward horizontal web of the angle irons 150, and comprise a suitable bearing surface for the mandrel shafts to rest. A pair of plates 156 secured to the standards 48, extend rearwardly and into engagement with the doffing mechanism 24 to maintain the angularity of the said doffer mechanism.

As viewed in Figures 8 and 9, as the partially wound mandrel of cloth is transferred to the doffing mechanism, generally indicated at 24, it will be seen that as the diametrical proportions of the roll increase, the doffing mechanism will rotate about the shaft 142, thus displacing the hangers and U-shaped frame out of contact with the retaining plates 156. This movement provides for the increasing distances between the center of the bearing block 154 which constitutes a retaining means for the mandrel upon which the cloth is being wound and the peripheral engagement with the drum 32'. A pair of angularly disposed retaining brackets 158 are fixed to the horizontal web of the angle irons 150 and provide further bearing surfaces for the mandrel shafts as the roll increases in diameter. An upwardly and rearwardly extending arm 160 is suitably journalled to the shaft 142 medially of one of the bearing blocks 144, and the outer end of the shaft 142. It is secured at its opposite end to a piston rod 162 of an air cylinder 164 which is pivotally connected to a standard 165. When the piston rod 162 of the air cylinder 164 is retracted the doffing mechanism is raised to the position as shown in Figure 8 and the mandrel will fall away from the bearing blocks 154 and brackets 158.

As viewed in Figure 2, the transverse shaft 142 has journalled at one end a cam arrangement 163 for the purpose of actuating a series of limit switches, the function of which will be more fully described below in connection with the electrical circuit.

From the foregoing description, it will be understood that as a roll of material has reached the desired proportions, the doffing mechanism is actuated through the limit switch L6 previously described, and introduces air to the cylinder 164, causing the piston rod to retract and raise the doffing mechanism about the shaft 142 by means of the connecting rod 160. Thus, the roll of cloth slips from the bearing blocks 154 and is positioned on the conveyor generally indicated at 26.

A further means for insuring that the free end of the cloth is placed around an empty mandrel is provided by a roller 186 which is rotatably secured to a pair of rearwardly extending arms 188. These arms in turn are pivotally secured at their opposite ends to a transverse shaft 190 which is journalled for rotation in suitable bearings. The roller 186 is lowered into frictional engagement with an empty mandrel by means of an upwardly extending bar 194 (Fig. 5) pivotally joined at its lower end to one end of a connecting bar 195 and at its upper end to a rearwardly extending bracket 196 which is secured by suitable means to the transverse bar 58, whose function it is to raise and lower the retaining sockets 44 and 46. The other end of bar 195 is fixedly attached to shaft 190. Thus it will be apparent that as an empty mandrel is lowered to receive the free end of cloth the roller 166 is simultaneously lowered to the position shown in Figure 9. When the partially filled mandrel is transferred to the doffing mechanism and the retaining sockets are held in a raised position, the roll 186 is likewise held in a raised position, as shown in Figure 8. A slit 197 in bar 194 permits overtravel of roller 186 and its associated bars 188, 195 and 194. Racks 198 engaging pinions 199 operated by handwheel 200 provide means to raise beam 58 manually if desired. However, this arrangement does not interfere with operation of cylinder 62.

Reference is now made to the wiring diagram shown in Figures 14A, 14B, 14C, and 14D. The lines extending from Figures 14A–14D are so oriented that the complete diagram may be arranged if the four sheets are joined so that Figure 14A is the upper left-hand sheet, Figure 14B the upper right-hand sheet, Figure 14C the lower left-hand sheet and Figure 14D the lower right-hand sheet. The circuit is illustrated at various points by heavy black lines which will indicate trunk lines containing a plurality of conductors. The wiring is shown as such for the purpose of clarity and simplicity. The leads from the various control units are illustrated as being angularly introduced into the above-mentioned trunk lines, the direction in which the leads enter the trunk lines serving to indicate the direction in which the lead is to be traced. Like reference characters for each conductor are provided at entrance and exit points to facilitate tracing individual conductors.

Referring primarily to Figs. 14A–14D, the automatic operation of the winding machine according to the present invention is under the control of a plurality of switches which are designated with the prefix L, some of which are referred to above. Switches L1–L13 and L15–L17 are limit switches operated by movements of various parts of the winding machine and switch L14 is a manually operated push button switch. Actual movements of the machine are under control of solenoid operated valves which control the various air cylinders which have been mentioned above.

In Figs. 14A–14D, the solenoid valves controlled by solenoid coils A and C are of a type which will admit air under pressure each to one end of the cylinder 62 only while the respective coil remains energized. The valve controlled by coil C will be arranged to admit air under pressure into the lower or raising end of cylinder 62 and the valve operated by coil A will admit air (preferably under a reduced pressure) to the lowering end of the cylinder. In the case of doffing cylinder 164 the solenoid valve operated by coil F will admit air under pressure in the doffing direction and the valve operated by coil G will admit air under pressure to the end of the cylinder which returns the doffing mechanism to its normal position. Each of the valves operated by coils A, C, F, and G will have suitable provision so that when the coils are not energized air trapped within the cylinders 62 and 164 may be exhausted to atmosphere so that operation of the valve on the opposite end of the cylinders will permit the pistons to be moved accordingly.

In the case of the valve operated by coil D, while coil D remains energized air will be supplied to the shifting end of cylinder 78. However, provision will be made in the valve operated by coil D (as by a spring return or the like) to cause air to be introduced into the opposite end of cylinder 78 when valve D is not energized. Similarly, in the case of blade cylinder 65, the valve operated by coil E will admit air into the advance end of the cylinder while coil E remains energized but will admit air to the return end of the cylinder when E is not energized. In both of the valves suitable exhaust will be provided for the end of the respective cylinders not under pressure.

The valve operated by coil H will be arranged to admit air under pressure into one end of cylinder 116 to move the bar 118 of the timing device. However, the spring 132 will return the piston of cylinder 116 to its normal position when H is de-energized and, therefore, this valve need have no provision for introducing air into the opposite end of cylinder 116.

Magnetically actuated contactors R1 through R13 are employed, as will be described below, for providing control circuits to the air valve operating coils through the previously mentioned switches. In addition to the magnetic contactors R1 through R13 the conveyor motor M is controlled through a magnetically actuated motor switch MR. A relatively low potential for energizing the operating coil of switch MR is provided in transformer $T_1$. Also, a relatively low potential may be separately supplied for operating the air valve operating coils through a second transformer $T_2$, and an overload responsive circuit breaker OL1 may be provided to protect predetermined circuits connected with the secondary winding of transformer $T_2$.

The location of each of the limit switches L1–L17 in relation to the apparatus and with regard to the movement of the switch contact arms as viewed in Figure 14 will now be given: Limit switch L1 (Figure 9) is mounted by any suitable means so that it will be operated by operating bar 58 when the bar is in its lowermost position whereat an empty mandrel is first placed in contact with the cloth moving over rolls 32 and 32'. When bar 58 engages L1 the switch contactors move into their lower or closed position, as viewed in Figure 14. L2 (Figure 3) is operated by an upstanding extension 59 on the connecting beam 58 but only when bar 58 is in an upper position when the mandrel held in jaws 44, 46 reaches a predetermined diameter and is ready to be shifted. When engaged by bar 58 switch L2 is moved to its upper or open position, as viewed in Figure 14.

Switch L3 (Figure 8) is operated by the shifting mechanism and is moved to its upper position in Figure 14 when the shifting mechanism is in the shifted position. Switch L4 (Figure 2) is operated by a cam system 168 which rotates when the doffing shaft 142 is rotated. L4 moves to its upper position in Figure 14C when cloth on the mandrel held in bearing blocks 154 builds up to a diameter where the roll is to be doffed.

Switch L5 (Figure 13) is operated by the plate 130 in timing device 30. L5 is moved to its upper position in Figure 14C when engaged by plate 130. Switch L6 (Figure 9) is operated by blade 64 when the blade is in its extended or cutting position. L6 moves to its upper position in Figure 14C when the blade is in the cutting position. L7 (Figure 2) is operated by the previously-mentioned cam arrangement on doffing shaft 142. L7 is moved to its upper position in Figure 14 when the doffing mechanism is in its completely operated position following the doffing of a roll. Switch L8 (Figure 8) is operated by the shifting mechanism. L8 is in its upper position in Figure 14C when the shifting mechanism is in its unshifted position. L9 (Figure 2) is operated when the doffing mechanism is in its fully doffed position. L9 moves to its upper position in Figure 14C when operated, the purpose of this switch being to clear the circuits if the push button L14 is employed to produce a doff of an incomplete roll.

Switch L10 (Figure 2) is operated by the doffing cam arrangement and is moved to the upper position in Figure 14D to close as the roll becomes too large before an automatic doffing operation has taken place. Switch L11 (Figure 7) is moved to its upper position in Figure 14D to open if the supply of mandrels becomes exhausted. Switch L12 (not shown in Figures 1–13) will be positioned to be operated by the conveyor 26 to move to its upper position in Figure 14D after the conveyor has moved a sufficient distance to displace a doffed roll so that a following roll may be doffed onto the conveyor. Switch L13 (not shown in Figures 1–13) will also be associated with the conveyor and positioned to be operated if too many rolls remain on the conveyor. L13 may be located in the path of rolls a considerable distance down the conveyor and when engaged by a roll will be moved to its upper position in Figure 14D. Push button switch L14 (not shown in Figures 1–13) may be moved to its lower position in Figure 14D to cause a premature doff following the detection of the next seam passing the timing device 30. L15 (Figure 12) is positioned to be operated to its upper position as shown in Figs. 14A–14D whenever actuating feeler arm 112 (Figure 11) senses a seam or sluff in the cloth W. L16 (Figure 2) is operated by the cam system 168 on doffing shaft 142 and is moved to its upper position in Figure 14D if the roll in the doffing mechanism becomes too large and an automatic doffing operation has not taken place. Switch L17 (not shown in Figures 1–13) is operatively connected with the compressed air line supplying compressed air to the various air cylinders and other uses of compressed air in the machine. Switch L17 will be operated to its upper or open position in Figure 14D if the air pressure fails.

The contactors R1–R13 are shown in Figs. 14A–14D in their non-energized position. Upon energization of the coils the contact arms will assume the dotted line positions.

Assuming a partially wound roll is on the first of two winder rolls in the process of being wound, magnetic contactor R2 is in its energized position by means of a magnetic contactor R1 and limit switch L2. When the roll of material becomes partially wound to the desired size and is ready to be transferred automatically to the doffing mechanism, the limit switch L2 is opened and the magnetic contactor R2 is de-energized. The operating coil C of solenoid operated valve 62' is now energized through the magnetic contactors R9, R2, and R1, thus releasing the mandrel from its retaining sockets by raising piston rod 60 of the air cylinder 62. At this same time, the coil D of solenoid operated valve 78' is energized through the magnetic contactors R3, R2, and R1 thus causing the shifting mechanism to be actuated by reason of the retraction of the piston rod 76 of air cylinder 78. The partially wound roll of material from the first of the two winder drums 32 is thus shifted to the second at 32'. Completion of this operation energizes the magnetic contactor R3 through the limit switch L3 and magnetic contactors R2 and R1 causing the operating coil D of solenoid valve 78' to become de-energized and the shifting mechanism returns to its normal position.

Simultaneous with the return of the shifting mechanism to its normal position, one of the previously stacked mandrels is dropped into the lower jaws of the vertical guide rack and is held in readiness to be lowered onto the moving roll 32. The return to normal position of the shifting mechanism closes a limit switch L8, making it possible to doff the roll of material, if desired. An occasion which would require a doffing operation at this time might be that the material being fed to the winder would change in pattern and it would be desired to place the new material on a separate mandrel. The actuation of the limit switch L8 will in turn energize the operating coil F of solenoid valve 164' through the magnetic contactors R3 and R8 causing the actuation of the serrated cutting blade 64 by means of the air cylinder 65. If, however, it is not desirable to doff the material at this time, the roll continues to increase in diametrical proportion in contact with the drum 32' and when it has reached a predetermined size, limit switch L4 is closed, causing the magnetic contactor R1 to be energized and R3 to become de-energized. The doffing operation occurs when the next seam or sluffed filling or extra thickness of material causes limit switch L15 to close momentarily. The closing of L15 causes the operating coils A and H of solenoid valve 62" and 116, respectively, to become energized through magnetic contactors R10, R9, R2, and R1. When coil A is energized, the mandrel which has been released from the rack and held in readiness, is now lowered by means of the piston rod 60 of the air cylinder 62 onto the moving material and a light pressure is maintained to preclude slippage. Simultaneously with the lowering of a mandrel onto the moving material, energization of coil H causes the air cylinder 116 of the timing mechanism generally indicated at 30 to be actuated to set the above-mentioned timing mechanism in operation. The above-mentioned timing mechanism generally indicated at 30, having been set in motion through the piston of the air cylinder 116, upon reaching its completion, closes limit switch L5 which energizes magnetic contactor R4 and de-energizes solenoid valve E through the limit switch L1 and magnetic contactors R5, R4, and R1. The limit switch L5 causes the magnetic contactor R4 to be energized through the contactors R4 and R10, the completion of this circuit thereby energizing the coil E of solenoid valve 65' through the limit switch L1. This energizes the magnetic contactors R5, R4, and R1, causing the serrated cutting blade 64 to be projected upwardly into the path of the moving material thereby cutting it and starting the free end of the cloth around a new mandrel. The just-mentioned circuit also actuates the coil B of solenoid valve 45' supplying a blast of compressed air through vent 45 to the underside of the material, directing it toward the new mandrel so as to insure a close contact with the free end of the cloth and the adhesive on the mandrel.

The upward projection of blade 64 actuates a limit switch L6 de-energizing solenoid valve coils A, B, E, and H (Figs. 14C and 14D), thus returning the cutting blade to its normal downward position and shutting off the air blast and relieving the downward pressure on the mandrel. The actuation of limit switch L6 also energizes magnetic contactor R5 and the coil F of solenoid valve 164', this valve being energized through the magnetic contactors R6, R5, (a holding circuit being set up in R5) and R1. When coil F is energized the doffing mechanism functions, releasing the roll of material from the winder and allowing it to drop onto the conveyor mechanism. The functioning of the doffing mechanism actuates limit switch L7 and at the same time de-energizes the magnetic contactor R8 and operates before conveyor motor M.

The control of energization of the conveyor motor indicated at M is through lines 201 and 202.

The function of the conveyor is to carry the roll of material away from the winder a distance sufficient to bring a new surface of empty conveyor into the position to receive the next roll of material doffed from the winder. This is a predetermined and fixed distance. Completion of the movement of the conveyor operates a limit switch L12 stopping the conveyor motor M and at the same time energizes the magnetic contactor R6 through lines 248 and 249 of limit switch L12. Simultaneously the solenoid valve G is energized through the magnetic contactor R6 and R1, causing the doffing mechanism to return to its normal down position until the limit switch L3 is again operated by the shifting mechanism and the solenoid valve G again is de-energized. The cycle of the machine is thus complete and ready to repeat.

If it is desired to doff a roll before the automatic doffing action takes place push button switch L14 is provided at the operator's control station. By closing this switch magnetic contactor R1 is energized and R3 is de-energized through magnetic contactors R7 and R8 and limit switch L8. The next seam closing the limit switch L15 sets the measuring device in motion and operates the doffing mechanism whereby the roll is doffed before it reaches the size at which it normally would be doffed.

The present invention also includes safety features in order to insure the proper functioning of the winder in cooperation with the source of supply from which the cloth may be received, namely, a set of drying cylinders used for drying crash toweling or the like. The drums 32 and 32' of the winder are driven from the same power source as the drying cylinders in order to maintain a constant speed ratio. As shown in the wiring diagram the stop circuit of the drying cylinders is wired through the magnetic contactor R13 which must be energized in order for the drier to operate. That is, the stop circuit must be open for the drier to operate. An emergency manual stop station is also provided in the stop circuit to the drying cylinders. The coil in the magnetic contactor R13 is energized by a circuit from the winder supply circuit through the magnetic contactors R11 and R12, connected in series, as shown in Figure 14B. The magnetic contactors R11 and R12 must be energized to allow the drier to operate. Magnetic contactor R11 is energized by means of the limit switches L11 and L17. The limit switch L11 is located on the inclined channel, generally designated at 28. If for some reason the supply of mandrels in the rack becomes depleted, the limit switch L11 is opened, causing the magnetic contactor R11 to become de-energized and stop the drier. The limit switch L17 is located on the compressed air line and if for some reason the air pressure becomes too low for the proper operation of the air cylinders, the limit switch L17 is opened, causing the magnetic contactor R11 to become de-energized and the drier to stop.

The magnetic contactor R12 is energized through the limit switch L13 through the overload releases OL2 in the magnetic starter MR, and through the transformer indicated at T1, which furnishes the control circuit for the conveyor motor. If the circuit breaker is off or tripped, the magnetic contactor R12 is de-energized and stops the drier. If the magnetic starter for the conveyor motor should trip out, R12 is de-energized and the drier is stopped. If the limit switch L13, which is located on the conveyor, should become opened due to the excessive number of completely wound rolls of material, the magnetic contactor is de-energized.

Limit switch L16 is operated by cam arrangement 188 journalled to the end of the transverse doffing shaft 142 and is actuated in the event that the roll should become of excessive diametrical proportions to be handled by the doffing mechanism. Limit switch L16 is wired in parallel with the limit switch L15 and performs the same function in the operation of the winder as the limit switch L15, as previously described. The limit switch L16 remains inactive except in the case of failure to operate by the limit switch L15. A limit switch L10 is wired in parallel with the limit switch L5 through the lines 225 and 226 and has the same part in the operation of the winder as the limit switch L5 previously described. The limit switch L10 remains inactive except when the limit switch L5 fails to operate. Limit switch L10 like switch L16 is operated by a cam before the roll of material becomes too large to be handled by the doffing mechanism.

Limit switch L9 is operated by the cam journalled to the transverse doffing shaft 142 and functions in the case that the winder has been made to doff a roll before it has reached the normal diameter to be doffed, as by the use of push button switch L14. When the roll of material is doffed, L9 clears the circuit through the lines 253 and 254 so that the next roll of material will build to normal size before the doffing operation is effected.

From the foregoing illustrative embodiment of the invention it will be apparent that there is provided a completely automatic winding machine which will function continuously so long as a supply of cloth and a supply of mandrels is available. Moreover, due to the several safety features described above, failure of the supply of mandrels or malfunction of any other part of the machine will cause the machine to be automatically stopped.

It is not intended that the foregoing detailed description limit the scope of the invention for the reason that many other embodiments of the invention will occur to others after reading this specification. For one example, it will be apparent that only a single winding drum is absolutely necessary to form a winding surface means, with the first and second winding stations of the mandrels having the roll in engagement with spaced points about the periphery of the single drum. In this embodiment the cutting blade could be operated adjacent the drum surface and stop after cutting the web but before damaging the surface.

What is claimed is:

1. In winding apparatus, supporting structure, winding surface means mounted for continuous movement on the supporting structure, means for positioning a winding mandrel in a first winding position in engagement with a web of material to be wound overlying a first portion of the winding surface means, automatic means comprising means responsive to the building up of a roll to a first predetermined size on the mandrel at the first winding position for shifting the roll to a second winding position on another portion of the winding surface means, automatic means for positioning a second mandrel in the first winding position as the roll continues to build up at the second winding position, means responsive to the building up of a roll to a second predetermined size at the second winding position to sever the web between the first and second winding positions and to cause the web to begin winding on the mandrel at the first winding position, and means for doffing the roll from the second winding position.

2. In winding apparatus, supporting structure, winding surface means mounted for continuous movement on the supporting structure, means for positioning a winding mandrel in a first winding position in engagement with a web of material to be wound overlying a first portion of the winding surface means, the mandrel positioning means comprising means for permitting movement of the mandrel at the first winding position away from the winding surface as a roll of material builds up on the mandrel, automatic means comprising means responsive to the building up of a roll to a first predetermined size on the mandrel at the first winding position for shifting the roll to a second winding position on another portion of the winding surface means, automatic means for positioning a second mandrel in the first winding position as the roll continues to build up at the second winding position, means responsive to the building up of a roll to a second predetermined size at the second winding position to sever the web between the first and second winding positions and to cause the web to begin winding on the mandrel at the first winding position, and means for doffing the roll from the second winding position.

3. In winding apparatus, supporting structure, winding surface means comprising first and second winding drums mounted for continuous movement on the supporting structure, power means for driving the drums in said continuous movement, means for positioning a winding mandrel in a first winding position in engagement with a web of material to be wound overlying the surface of the first winding drum, the mandrel positioning means comprising means for permitting movement of the mandrel at the first winding drum away from the surface of the drum as a roll of material builds up on the mandrel, automatic means comprising means responsive to the building up of a roll to a first predetermined size on the mandrel in the first winding position for shifting the roll to a second winding position in engagement with the surface of the second winding drum, means for mounting the mandrel of the roll at the second winding position so that the roll may continue to build up to a second predetermined size at the second winding position, automatic means for positioning a second mandrel in the first winding position as the roll continues to build up at the second winding position, severing blade means positioned for movement into engagement with the web of material between the first and second winding drums, means responsive to the building up of the roll at the second winding position to the second predetermined size to advance the severing blade into engagement with the web to sever the latter, means for training the severed edge of the advancing web over the mandrel in the first winding position to start a roll on the just-mentioned mandrel, and means for doffing the completed roll from the second winding position.

4. In a winding apparatus, supporting structure, winding surface means comprising first and second winding drums mounted for continuous movement on the supporting structure, power means for driving the drums in said continuous movement, means for positioning a winding mandrel in a first winding position in engagement with a web of material to be wound overlying the surface of the first winding drum, the mandrel positioning means comprising guide means for permitting reciprocable movement of the mandrel at the first winding drum upwardly from the surface of the first drum as a roll of material builds up on the mandrel, automatic means comprising means responsive to the building up of a roll to a first predetermined size on the mandrel in the first winding position for shifting the roll to a second winding position in engagement with the surface of the second winding drum, means comprising bearing blocks open upwardly for rotatably mounting the mandrel of the roll at the second winding position, the bearing blocks being mounted on a doffing structure, the doffing structure being pivotally mounted on the supporting structure so that the mandrel will be retained by force of gravity in the bearing blocks as the roll continues to build up to a second predetermined size at the second winding position, automatic means for positioning a second mandrel in the first winding position as the roll continues to build up at the second winding position, severing blade means positioned for movement into engagement with the web of material between the first and second winding drums, means responsive to the building up of the roll at the second winding position to the second predetermined size to advance the severing blade into engagement with the web to sever the latter, means for training the severed edge of the advancing web over the mandrel in the first winding position to start a roll on the just-mentioned mandrel, and means for doffing the completed roll from the second winding position.

5. In winding apparatus, supporting structure, winding surface means comprising first and second winding drums mounted for continuous movement on the supporting structure, power means for driving the drums in said continuous movement, means for positioning a winding mandrel in a first winding position in engagement with a web of material to be wound overlying the surface of the first winding drum, the mandrel positioning means comprising means for permitting movement of the mandrel at the first winding drum away from the surface of the drum as a roll of material builds up on the mandrel, automatic means comprising means responsive to the building up of a roll to a first predetermined size on the mandrel in the first winding position for shifting the roll to a second winding position in engagement with the surface of the second winding drum, means for mounting the mandrel of the roll at the second winding position so that the roll may continue to build up to a second predetermined size at the second winding position, rack means mounted on the supporting structure and adapted to contain a supply of empty winding mandrels, means comprising means operated by the shifting means for moving an empty mandrel from the rack means into the first winding position as the roll continues to build up at the second winding position, severing blade means positioned for movement into engagement with the web of material between the first and second winding drums, means responsive to the building up of the roll at the second winding position to the second predetermined size to advance the severing blade into engagement with the web to sever the latter, means for training the severed edge of the advancing web over the mandrel in the first winding position to start a roll on the just-mentioned mandrel, and means for doffing the completed roll from the second winding position.

6. Apparatus as in claim 3 and further comprising conveyor means for receiving doffed rolls from the second winding position, and means actuated by the doffing means for energizing the conveyor means to move the doffed roll a predetermined distance along the conveyor means.

7. Apparatus as in claim 6 and further including means responsive to the presence of a predetermined number of rolls on the conveyor means for disabling the power means.

8. Apparatus as in claim 3 and further including means responsive to the thickness of the web for operating control means to actuate the severing blade advancing means.

9. Apparatus as in claim 8 further including timing means operated by the thickness responsive means for delaying the operation of the severing blade means for a predetermined synchronizing interval sufficient to cause the severing blade to operate only at the section of the web whereat the thickness responsive means was actuated.

10. In winding apparatus in which a mandrel is held in reciprocable jaw means while a roll of material is built up to a first predetermined size at a first winding position, means to shift a mandrel out of the jaw means and to insert an empty mandrel into the jaw means comprising channeled rack means adapted to guide a supply of empty mandrels toward the jaw means, semi-open retaining means having first and second rotated positions, the retaining means being so positioned in its first rotated position to retain the supply of mandrels in the rack means, arm means for shifting a loaded mandrel out of the jaws, means actuated by the arm means for moving the semi-open mandrel retaining means into the second rotated position whereby the next available mandrel of the supply of mandrels is released in the rack means, means mounted on the arm means for retaining the released mandrel while the arms are in the shifting position, the retaining means being arranged to be withdrawn from engagement with the empty mandrel when the shifting arms are returned to their normal position whereby an empty mandrel is guided by the channeled rack means into engagement with the jaw means.

11. In winding apparatus of the type in which a roll of material is wound on a mandrel by frictional engagement between the roll and a driven winding surface, material severing means in operative relation to the material being wound, means for doffing a completed roll upon the supply of material to the roll being cut off by the severing means, said means comprising semi-open bearing blocks in which the mandrel is retained by a force of gravity while the roll is being wound, and means for altering the position of the bearing blocks for a doffing operation, the position altering means being connected to and responsive to the severing means and comprising means for rotating the bearing blocks so that the force of gravity will cause the mandrel to fall free of the bearing blocks.

12. In winding apparatus, first and second winding drums, power means for continuously rotating the winding drums, upwardly extending channeled guide means positioned adjacent the ends of the winding drums, jaw means positioned to reciprocably slide in the channeled guide means, the jaw means comprising upper and lower jaws resiliently urged together, means for moving the jaw means in each guide means in unison, means for arresting the upward movement of the lower jaw members a predetermined distance below the limit of upward movement of the upper jaw means, whereby the jaw members may be separated, channeled rack members leading into the opening between the jaw members in the separated position of the latter, a supply of empty winding mandrels, the empty mandrels being retained in the channeled rack means, means for releasing a mandrel from the rack means into engagement with the lower jaw members, and means for lowering the jaw members so that the empty mandrel may be engaged with a web of material overlying the first winding drum.

13. In winding apparatus, first and second winding drums, means for retaining a winding mandrel in a first winding position so that the roll being wound is initially in engagement with the first winding drum, limit switch means responsive to a roll of a first predetermined size in the first winding position for actuating shifting means to shift the roll into a second winding position in engagement with the second winding drum, means including the shifting means for inserting an empty winding mandrel into the first winding position, means including timing means for operating a web cutting device, limit switch means responsive to a roll of a second predetermined size at the second winding position to energize said timing means, the so-energized timing means producing a triggering signal upon the subsequent arrival of an area of increased web thickness to operate said web cutting device, means actuated with the web cutting apparatus for starting the material around the empty mandrel at the first winding position, and means energized upon completion of the cutting operation by the cutting means for doffing the completed roll from the second winding position.

14. Apparatus as in claim 13 and further including conveyor means for receiving the doffed rolls, and control means energized by a doffing operation for advancing the conveyor a predetermined distance to provide an empty conveyor space adjacent the doffing position for a following doffing operation.

References Cited in the file of this patent

UNITED STATES PATENTS

| Number | Name | Date |
|---|---|---|
| 542,034 | Simpson | July 2, 1895 |
| 1,207,477 | Bignell | Dec. 5, 1916 |
| 1,730,552 | Aldrich | Oct. 8, 1929 |
| 1,814,586 | Crosby | July 14, 1931 |
| 1,979,334 | Lyth | Nov. 6, 1934 |
| 2,211,362 | Bennett | Aug. 13, 1940 |
| 2,215,625 | Thourot | Sept. 24, 1940 |
| 2,385,692 | Corbin et al. | Sept. 25, 1945 |